United States Patent
Schutt

[15] 3,673,108
[45] June 27, 1972

[54] HYDROCRACKING CATALYST ACTIVATION TREATMENT

[72] Inventor: Hans U. Schutt, Lafayette, Calif.

[73] Assignee: Shell Oil Company, New York, N.Y.

[22] Filed: Dec. 31, 1969

[21] Appl. No.: 889,681

[52] U.S. Cl. ...................... 252/411 R, 208/111, 252/415, 252/416, 252/439, 252/442
[51] Int. Cl. .................. B01j 11/02, B01j 11/30, B01j 11/76
[58] Field of Search ............... 252/415, 416, 442, 439, 411; 208/111

[56] References Cited

UNITED STATES PATENTS

| | | | |
|---|---|---|---|
| 3,316,169 | 4/1967 | Peck et al. | 208/111 |
| 3,213,012 | 10/1965 | Kline et al. | 208/110 |
| 3,269,936 | 8/1966 | Goldthwait et al. | 208/111 |
| 3,459,675 | 8/1969 | Crecelius et al. | 252/411 R |
| 3,324,045 | 6/1967 | Mason | 252/439 |
| 3,422,001 | 1/1969 | Kouwenhoven et al. | 252/439 |

*Primary Examiner*—Daniel E. Wyman
*Assistant Examiner*—P. E. Konopka
*Attorney*—Harold L. Denkler and Glen R. Grunewald

[57] ABSTRACT

A hydrocracking catalyst containing an Iron Group metal on a silica-aluming refractory oxide support is deactivated by contact with water vapor at elevated temperatures. The catalytic activity and stability are improved by treating the catalyst in the presence of sulfide with a gas comprising hydrogen and a fluorine compound at a temperature of about 250° to 550° C.

8 Claims, No Drawings

HYDROCRACKING CATALYST ACTIVATION TREATMENT

BACKGROUND OF THE INVENTION

1. Field of the Invention

This invention relates to a method of activating a hydrocracking catalyst. In particular, it relates to a gaseous hydrogen-fluorine treatment of a catalyst comprising hydrogenation metal components on an acid acting amorphous refractory oxide support.

2. Description of the Prior Art

In the hydrocracking of hydrocarbon fractions, catalysts are generally used which comprise a hydrogenation component on a suitable amorphous refractory oxide support. For many applications the support is either acid-acting or has induced acidic properties, e.g., by the incorporation of a halogen component. The hydrogenation component is customarily supplied by one or more transition metals, for example, metals from Group VIB and Group VIII. Particularly suitable are nickel, tungsten, cobalt and molybdenum. Hydrocracking catalysts may be prepared by impregnating the support with a solution or dispersion of a decomposable salt of the metal hydrogenation component or by incorporating the metal component by reaction, e.g., ion exchange, into a hydrogel of the refractory oxide support which is substantially free (usually less than 0.1%w) from sodium. While the hydrogenation component in the final catalyst can be employed as the metal, metal oxide, metal sulfide or mixtures thereof, the sulfide form is generally used in hydrocracking processes.

Catalysts lose some or all of their activity after a period of continued use, the rate of deactivation depending to a large extent upon the conversion conditions and the character of feedstock employed. This loss in catalytic activity is generally attributed to several factors that occur within the reaction zone. One of the deactivation effects is due to the formation of carbonaceous deposits on the catalyst. Another type of deactivation results from the deposit and build-up of nitrogen-containing compounds on the catalyst. Petroleum fractions used as feedstocks in hydrofining and hydrocracking and the like contain varying concentrations of organic nitrogen-containing compounds. These nitrogen compounds are converted to ammonia which "titrates" the acidic sites of the catalyst thereby neutralizing partially the catalytic acidity necessary for the desired conversion reaction. Ammonia is desorbed from the catalyst at temperatures common in oxidative regeneration. The catalyst can also be deactivated by contact with water vapor at elevated temperatures.

Water vapor can contact the catalyst at elevated temperatures either during regeneration or during normal operation. In commercial practice the effluent gas during regeneration is recycled to the reactor after it has passed through a caustic scrubber for $SO_2$ removal. When the gas dryers, which are provided for drying the hydrogen recycle to a second stage hydrocracking process, are not large enough to dry all the recycle gas during regeneration, catalysts will be contacted by even more water than that resulting from combustion of coke because part of the recycle gas will have to bypass the dryer facilities. Alternatively, the gas recirculation rate could be reduced to the extent required to dry all the gas. The regeneration time would, of course, be increased proportionately. The quantity of water formed by combustion of hydrogen in the coke amounts to about as much as the water added to the regeneration gas stream when operating the process without recycle gas drying facilities. Fresh catalysts can also be deactivated by contact with water vapor in pretreatment gases where no gas dryer facilities are provided, e.g., when sulfiding the catalyst with an $H_2S$-in-hydrogen mixture.

Removal of coke from a coke deactivated catalyst can generally be accomplished by oxidative regeneration, i.e., by burning the coke in the presence of an oxygen-containing gas at elevated temperature. However, oxidative regeneration is as a rule detrimental to the overall life of a catalyst to the extent that after several regenerations the catalyst must be discarded. The formation of water during oxidative coke removal subjects the catalyst to steam at high temperature which is known to be a deactivating influence. Fresh catalysts are also partially deactivated if subjected to high temperature water vapor before using them in the hydrocracking process. This is particularly evident when a catalyst is presulfided in a plant without recycle gas drying facilities.

During normal hydrocracking operations the effluent is frequently washed with water to remove ammonia and sulfur compounds. The water-saturated gas is separated from the liquid effluent and recycled to the process. Unless an adequate recycle dryer is present water from this source can contact the catalyst at elevated temperatures. Water can also enter the process with the feed, but this amount is usually small.

Catalysts are generally deactivated when contacted with moist gases at temperatures between about 300° and 600° C. The deactivation is somewhat greater at the higher temperatures. For example, when fresh catalysts are treated at a temperature of 510° C with gases which are saturated with water vapor at 47° C an activity loss of about 15° C is observed. When the treating temperature is reduced to 455° C the activity loss is about 10° C. Similar losses in activity are observed when deactivated catalysts are regenerated in the presence of moisture. Calcining the catalyst in dry inert gas at high temperatures after contact with moist gases does not restore the lost activity.

A method has now been discovered to reactivate catalysts which have been deactivated by water vapor.

SUMMARY OF THE INVENTION

The activity and stability of hydrocracking catalysts comprising an Iron Group metal and a silica-alumina refractory oxide support which have lost activity by contact with water vapor at about 300°–600° C are markedly improved by a reconditioning treatment which comprises contacting said catalysts in the presence of sulfide with a gas comprising hydrogen and a fluorine compound at a temperature of about 250°–550° C prior to reuse in a hydrocracking process. This fluorine treatment is effective for both fresh and regenerated catalysts which have been contacted with water vapor. The fluorine compound, preferably difluoroethane, can be added to the hydrogen-rich gas stream either during or after the catalyst sulfiding treatment.

DETAILED DESCRIPTION

The fluoriding treatment of this invention is applicable to acid-acting amorphous hydrocracking catalysts in general, i.e., those having refractory oxide solid supports such as alumina, silica, magnesia, zirconia, thoria, and mixtures thereof. Such supports may have either natural acid-acting properties, e.g., $SiO_2$-$Al_2O_3$, or induced acidity, e.g., by adding halogen to the support. A particularly suitable refractory oxide base is predominantly siliceous, containing from about 40–90%w silica with the remainder, i.e., 60–10%w, being alumina, titania, magnesia, etc. A silica-alumina catalyst base having good cracking activity comprises from about 70–90%w silica and from about 30–10%w alumina. An acid-acting amorphous refractory oxide is to be distinguished from crystalline aluminosilicates known in the art as zeolites or molecular sieves. The preparation of amorphous refractory oxide materials is described in "Catalysis, VII," Rheinhold Publishing Company, New York, 1960, pages 1–9.

Sulfided nickel or sulfided nickel-tungsten on a silica-alumina support are specific examples of hydrocracking catalysts for which the treatment of the invention is appropriate. It is especially appropriate for catalysts which contain fluoride. In general, the catalysts of this invention contain about 0.1–25%w of the Iron Group metal, 0.1 to about 7%w fluoride and optionally, 1–15%w Group VIB metal. Hydrocracking catalysts which contain from about 3–7%w nickel respond very well to the treatment of the invention. The catalyst may be in any physical form suitable for use in a hydrocracking process. Thus, powdered, granular and extruded pellets of catalyst are subject to the treatment of the invention.

One measure of catalyst hydrocracking activity is the temperature required to achieve a specified conversion of feed to lower boiling hydrocarbons in the hydrocracking process. The lower the temperature requirement the more active the catalyst. Catalyst stability is indicated by the rate of temperature increase required to give a fixed conversion under specified hydrocracking conditions. The more stable catalysts will show a lower rate of temperature increase. Thus, longer processing runs (and more onstream time) can be had before the catalyst is essentially deactivated.

The catalytic activity and stability of catalysts deactivated by contact with water vapor at elevated temperatures are improved by treating the catalyst in the presence of sulfide with a gaseous fluorine-containing compound in a reducing atmosphere such as hydrogen. Sulfide may be present either on a catalyst which has been presulfided or in the treating gas of this invention. However, the presence of sulfide is essential to protect the catalyst from fluorine attack. The treatment is more than mere replacement or addition of fluoride since the effect is observed even though the catalyst is exposed to an amount of fluorine which could increase the catalyst fluoride content by less than 1%w. This activation treatment can be accomplished more effectively by adding a fluorine-containing compound to the hydrogen-rich gas stream either during or after sulfiding, but preferably after sulfiding. The type or concentration of the sulfur-containing compound used for sulfiding is not critical. However, hydrogen sulfide is readily available and generally preferred. Concentrations of from about 0.1 to 20%v $H_2S$ in hydrogen are especially suitable. The addition of small amounts of fluorine to the catalyst is more effective when applied in the gas phase in the absence of oil than when dissolved in the feed.

Any fluorine compound which is readily vaporized in a hydrogen rich gas at temperatures of about 250°-550° C is suitable for the activation treatment. Examples of such compounds are fluorine, hydrogen fluoride, difluoroethane (DFE), etc. Difluoroethane is preferred because of its ease in handling. The concentration of fluorine in the gas stream is suitably in the range from about 0.001%v to 1.0%v, although higher concentrations could be used. However, if lower concentrations are used it would be necessary to extend the treatment time, while with higher concentrations corrosion problems could be encountered. A concentration of about 0.02%v DFE in the sulfiding gas stream is preferred. The treatment is generally continued for a period of 1 to 6 hours, although longer periods can be used.

Suitable feedstocks for hydrocracking processes employing these catalysts include any hydrocarbon boiling above the boiling range of the desired product where the nitrogen content is below about 50 ppm. For gasoline production, hydrocarbon distillates boiling in the range of about 200°-510° C are preferred. Such distillates may have been obtained either from distillation of crude oils, coal tars, etc., or from other processes generally applied in the oil industry such as thermal or catalytic cracking, visbreaking, deasphalting, or combinations thereof.

Appropriate operating conditions for the hydrocracking process include temperatures in the range of about 250° to about 400° C, hydrogen partial pressures of about 500 to 2,000 psi, liquid hourly space velocities (LHSV) of about 0.2 to about 10, preferably 0.5 to 5, and hydrogen/oil ratios of about 5 to 50. Feed can be introduced to the reaction zone as a liquid, vapor or mixed liquid-vapor phase depending upon the temperature, pressure and amount of hydrogen mixed with the feed and the boiling range of the feedstock utilized. The hydrocarbon feed, including fresh as well as recycled feed, is usually introduced into the reaction zone with a large excess of hydrogen. Excess hydrogen is generally recovered from the reaction zone effluent and recycled to the reactor together with additional make up hydrogen.

The following examples illustrate the invention and its advantages:

EXAMPLE I

To demonstrate the activity improvement a fresh catalyst was treated with and without a fluorine compound.

A fresh commercial catalyst comprising 3.1%w W, 4.9%w Ni and 3.4%w F on a base of 22%w $Al_2O_3$/78%w $SiO_2$ was used for the tests. A sample of the catalyst was subjected to a wet pretreatment simulating a commercial unit without gas drying facilities. It consisted of sulfiding the catalyst at 500° C for 8 hours at a pressure of 500 psi with a gas mixture comprising $H_2S$ and hydrogen saturated with water at 47° C (1). The effect of fluorine was determined by adding 0.02%v difluoroethane (DFE) to the sulfiding gas and continuing the above treatment for 5 hours (2). Another sample of the fresh catalyst was sulfided under similar conditions except the sulfiding gas was essentially dry (3).

Catalyst activity was determined by hydrocracking a hydrotreated catalytically cracked heavy gas oil (30° API; boiling range about 230°-400° C) at 0.67 liquid hourly space velocity (LHSV), 1,500 psig pressure, and 10/1 hydrogen to oil ratio. The temperature required to achieve a 67 percent conversion of feedstock to products boiling below 196° C was selected as a measure of activity. The results at the end of 80 hours were as follows:

TABLE 1

Treatment of Fresh Catalysts

| Catalyst Description | DFE in sulfiding Gas, %v | 80-Hour Activity, °C. |
|---|---|---|
| 1. Wet sulfiding gas; no fluorine | 0.0 | 283 |
| 2. Wet sulfiding gas + fluorine | 0.02 | 279 |
| 3. Dry sulfiding gas; no fluorine | 0.0 | 272 |

The activity loss of fresh catalyst resulting from the wet treatment is 11° C. The treatment with a fluorine compound increased the 80-hour activity 4° C. Previous tests have shown that extending the presulfiding beyond 8 hours does not significantly affect activity. Thus, the improved activity is attributed to the fluorine treatment.

EXAMPLE II

This example demonstrates the improved activity which can be realized by treating regenerated catalysts with a fluorine compound.

A sample of catalyst similar to that of Example I was deactivated in a hydrocracking process to a 4.8%w carbon content. This catalyst was regenerated by contacting the catalyst with 480 volumes of gas/volume of catalyst/hour at 455° C and at 400 psi pressure for 40 hours. The regeneration gas, comprising about 1%v $O_2$ in nitrogen, was saturated with water at 47° C. A sample of the regenerated catalyst was sulfided for 2 hours at 375° C with a mixture of $H_2S$ in hydrogen. Another sample of the catalyst was sulfided in a similar manner except that DFE was added to the sulfiding gas.

The 80-hour activity of these catalysts was then determined using the same feed and operating conditions as in Example I. The results were as follows:

TABLE 2

Treatment of Regenerated Catalysts

| Catalyst Description | DFE in sulfiding Gas, %v | 80-Hour activity, °C. |
|---|---|---|

| | | |
|---|---|---|
| 1. Wet regeneration gas; no fluorine | 0.0 | 311 |
| 2. Wet regeneration gas + fluorine | 0.087 | 298 |

Before regeneration the above catalyst had a temperature requirement of 352° C. The activity was increased 41° C by the oxidative regeneration and an additional activity increase of 13° C was realized by adding 0.087%v DFE to the sulfiding gas.

EXAMPLE III

To demonstrate the effect of a fluorine treatment on catalyst stability, long-term hydrocracking tests were performed on both fresh and regenerated catalysts.

For these tests a hydrotreated 40/60 mixture of catalytically cracked light and heavy gas oils (27° API; 250°–400° C boiling range) was hydrocracked at 1,800 psig, 1.0 LHSV, 1.25 CFR, 10/1 $H_2$/oil ratio. The hydrogen-rich gas was saturated with water at a temperature of 43° C.

The fresh catalyst was that of Example I. A sample of this catalyst was presulfided with a gas comprising $H_2S$, hydrogen and water vapor for 8 hours at 375° C (A). Run A simulated fresh catalyst pretreatment and oil processing in a plant without recycle gas dryers. Another sample of the catalyst was treated in the same manner except for an activation treatment with 0.02%v DFE in an $H_2S/H_2$ gas stream for 5 hours at 375°F after sulfiding the catalyst (B).

The regenerated catalyst was deactivated as described in Example II to a 2.8%w carbon in a hydrocracking process. The regeneration gas comprised 0.5%v $O_2$ in dry nitrogen. The deactivated catalyst was contacted with 500 vol/vol/hour of this gas at 455° C and 400 psig for 8 hours after massive oxygen breakthrough. The catalyst was then presulfided with a gas comprising dry $H_2S$ and hydrogen for about 8 hours at 375° C. One sample of the catalyst was tested after sulfiding (Run C). Another sample of catalyst was activated with 0.02%v DFE added to the $H_2/H_2S$ gas stream for 5 hours at 375° C (Run D). The results of these tests were as follows:

TABLE 3

Effect of Fluorine Treatment on Catalyst Stability

| | Temperature Required for 80% Conversion to Products Boiling Below 196°C, °C | | | |
|---|---|---|---|---|
| | Fresh Catalyst | | Regenerated Catalyst | |
| Run Length, Days | A no fluorine | B fluorine | C no fluorine | D fluorine |
| 5 | 321 | 323 | 325 | 319 |
| 10 | 332 | 328 | 333 | 328 |
| 15 | 340 | 336 | 343 | 336 |
| 20 | 346 | 342 | 349 | 340 |
| 30 | 358 | 348 | 362 | 348 |
| 40 | 370 | 350 | 370 | 355 |
| 45 | 380(n) | 351 | 380 | 356 |
| 50 | — | 352 | — | 357 |
| 60 | — | 353 | — | 358 |
| 70 | — | 358 | — | 358 |
| 75 | — | 360 | — | 358 |

(n)Run terminated because of temperature limitations.

Both fresh and regenerated catalysts which have been treated with fluorine show comparable activity and stability. Both are greatly improved over the catalysts which have not been so treated. The fluorine treatment has more than doubled first cycle catalyst life.

EXAMPLE IV

This example demonstrates that the fluorine treatment of the invention can be used to advantage while a run is in progress.

Often after about 21 days operation nickel-containing catalysts will show a rapid decline in activity (about 20° C in less than 5 days) before reaching stable operation. The time at which stable operation is reached depends upon the nitrogen content of the feed and is thought to occur after the acid sites have been neutralized by nitrogen. The rapid decline is thought to be caused by a deterioration of the catalyst surface, possibly by contact with water vapor from residual oxygen in the feed. This sudden activity decline can be eliminated by subjecting the catalyst to a fluorine treatment after about 21 days operation.

For this test a laboratory prepared silica-alumina based catalyst comprising 6%w Ni and 2%w F was used to hydrocrack a hydrotreated 50/50 catalytically cracked light/heavy gas oil feed mixture (29° API; 240°–390° C boiling range). Operating conditions were 1,800 psig, 1.0 LHSV, 1.25 CFR and 10/1 $H_2$/oil ratio. During operation, 1%w sulfur and 7.5 ppm fluorine were added to the fresh feedstock. After 21 days of operation at these conditions the feed was discontinued and the catalyst then was subjected to reconditioning with a gas comprising 0.02%v DFE and hydrogen at 400° C for five hours. Results of this interim fluorine treatment are given in Table 4. Data for a first cycle operation under similar conditions without fluoriding treatment are included for comparison.

TABLE 4

Effect of Interim Fluorine Treatment on Catalyst Activity

| | Temperature Required for 80% Conversion (<196°C), °C | |
|---|---|---|
| Run Length Days | 1st Cycle No Fluorine Treat | 1st Cycle Interim Fluorine Treat |
| 5 | 295 | 295 |
| 10 | 300 | 300 |
| 15 | 302 | 302 |
| 20 | 310 | 310 |
| 21 | No Treat | Fluorine Treat |
| 25 | 326 | 312 |
| 30 | 337 | 315 |
| 35 | 336 | 320 |
| 40 | 335 | 325 |
| 50 | 336 | 325 |

It is apparent that there was no sharp decline in activity such as that experienced without the treatment. Instead, the temperature decline rate remained about the same as before interim reconditioning. As interim fluorine treatment can result in longer processing runs before reaching complete catalyst deactivation or in processing runs of the same length of time at higher feed rates.

I claim as my invention:

1. A process for increasing the catalytic activity and stability of a fresh or oxidatively regenerated hydrocracking catalyst comprising 0.1–25%wt iron group metal and a support having from about 40–90%wt silica, 60–10%wt alumina, and 0.1 - 7% fluoride said catalyst having become deactivated by contact with water vapor at elevated temperatures, which consists essentially of contacting the catalyst in the absence of hydrocarbon feedstock and in the presence of sulfide with a hydrogen-containing gas having from about 0.001–1%v of a vaporized fluorine compound at a temperature of 250° to 550° C for a period of about 1–6 hours such that the catalyst fluoride content is increased by less than 1%wt.

2. The process of claim 1 wherein the catalyst also contains 1–15%wt group VI B metal.

3. The process of claim 1 wherein the fluorine compound is difluoroethane.

4. The process of claim 1 wherein the catalyst has been deactivated by contact with water vapor from an oxidative regeneration.

5. The process of claim 1 wherein a fresh catalyst has been deactivated by contact with a gas comprising hydrogen, a sulfur compound and water vapor at temperatures between 300° and 600° C.

6. The process of claim 1 wherein the catalyst comprises a refractory oxide consisting essentially of from about 70–90%w silica and 30–10%w alumina, from about 3–7%w nickel and 0.1–7%w fluoride.

7. The process of claim 6 wherein the catalyst also contains 1–15%w tungsten.

8. The process of claim 6 wherein the catalyst is sulfided and treated simultaneously with a gas consisting essentially of hydrogen, from about 0.1–20%v hydrogen sulfide and about 0.02%v difluoroethane.

* * * * *